United States Patent
Bennett et al.

[11] Patent Number: 5,797,432
[45] Date of Patent: Aug. 25, 1998

[54] PIPE REPAIR CLAMP

[75] Inventors: Peter George Bennett, Morpeth; William Edgar Robinson, Newcastle Upon Tyne, both of England

[73] Assignee: British Gas plc, London, England

[21] Appl. No.: 762,752

[22] Filed: Dec. 11, 1996

[30] Foreign Application Priority Data

Dec. 14, 1995 [GB] United Kingdom ............... 9525590

[51] Int. Cl.$^6$ .................................................. F16L 55/168
[52] U.S. Cl. ................ 138/99; 138/97; 138/155; 138/158; 138/167
[58] Field of Search ................. 138/99, 97, 98, 138/155, 158, 167, 168, 165, 162

[56] References Cited

U.S. PATENT DOCUMENTS

| | | | |
|---|---|---|---|
| 164,028 | 6/1875 | Peake | 138/99 |
| 924,262 | 6/1909 | Moll | 138/99 |
| 1,693,081 | 11/1928 | Kass . | |
| 2,660,200 | 11/1953 | Corey | 138/99 |
| 2,898,945 | 8/1959 | Backer . | |
| 3,685,545 | 8/1972 | Smith et al. . | |
| 3,914,100 | 10/1975 | Guskea | 138/162 |
| 3,954,288 | 5/1976 | Smith | 138/99 |
| 4,535,822 | 8/1985 | Rogers, Jr. . | |
| 4,768,813 | 9/1988 | Timmons | 138/99 |
| 4,790,058 | 12/1988 | Miller | 138/99 |
| 5,301,983 | 4/1994 | Porowski | 138/99 |

FOREIGN PATENT DOCUMENTS

| | | |
|---|---|---|
| 0 418 008 | 3/1991 | European Pat. Off. . |
| 2 189 000 | 10/1987 | United Kingdom . |
| 2 247 295 | 2/1992 | United Kingdom . |

Primary Examiner—Denise L. Ferensic
Assistant Examiner—James F. Hook
Attorney, Agent, or Firm—Oblon, Spivak, McClelland, Maier & Neustadt, P.C.

[57] ABSTRACT

A pipe repair clamp especially for subsea offshore work has two half-shells held together around the pipe by two sets of diametrically opposite interlocking formations comprising in each set a series of abutments integral with a half-shell and a series of hooks integral with the other half-shell. The abutments are arranged in a castellated formation and provide first surfaces opposed to and engaged by second surfaces provided by the hooks. The half-shells have opposed abutting longitudinal faces with a longitudinal seal between each two abutting longitudinal faces extending along the half-shells. The longitudinal seals at their ends seal against 180° seals at each end of the clamp, each 180° seal being at an end of a respective half-shell. An annular gap 18 between the clamp 10 and the pipe is fillable with repair grout.

3 Claims, 4 Drawing Sheets

FIG. 4.
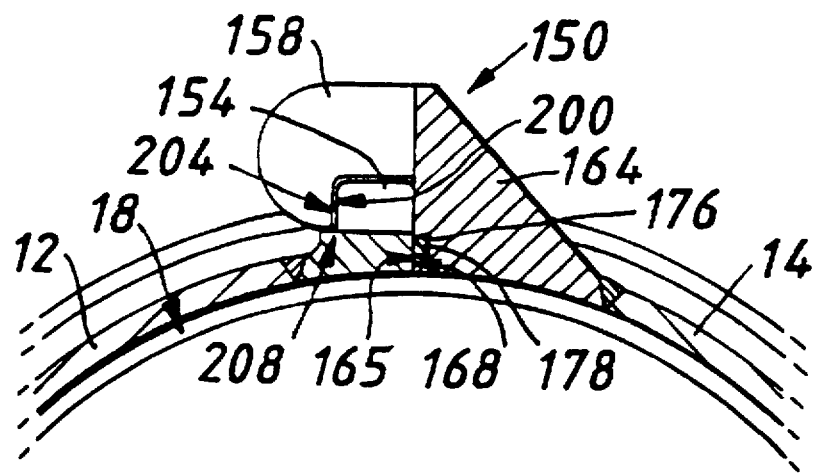
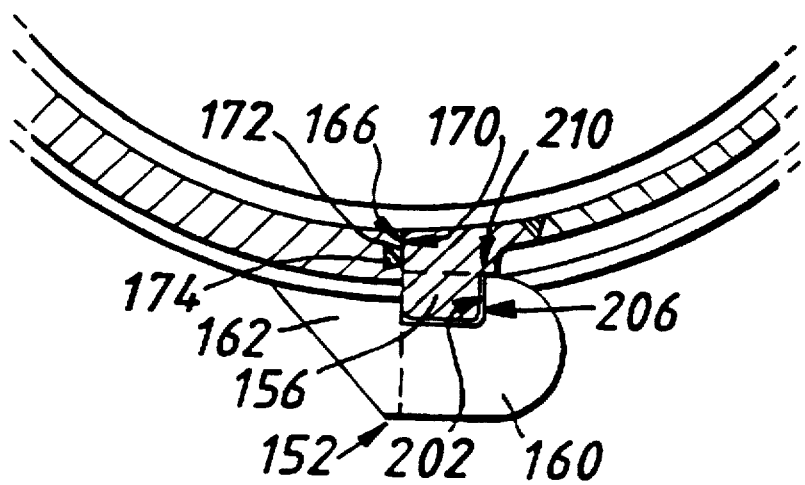

5,797,432

1

PIPE REPAIR CLAMP

BACKGROUND OF THE INVENTION

The invention relates to clamps for repairing pipes.

British patent No. 1140549 describes a pipe repair clamp made up of two halves which are brought together about the pipe in a direction parallel to the length of the pipe. One half has a longitudinal ear-shaped guide along each longitudinal edge which guide receives a corresponding flange extending along each longitudinal edge of the other half. The guides and flanges are slightly inclined to the length of the halves so that as the flanges enter the guides the two halves are pulled towards each other. The annular space between the clamp and the pipe is filled with grout.

British patent No. 602208 describes a device for rigidly connecting bars or tubes in which each clamp part comprises two parts, one having at one longitudinal edge a hook providing a groove and having at the other edge an abutment edge and the other part having the same formations at corresponding opposite edges. The parts are fitted together by relative sliding parallel to the direction of the grooves and abutment edges, which are inclined to the generatrices of the half-round recesses in each part. Thus, the two parts are clamped tightly in the direction of a tube held in the recesses as the parts are driven home.

The clamps just described are relatively small items adapted for manual assembly.

The present invention is intended for application, to for example, relatively large gas transmission, or distribution, pipes, particularly transmission pipes installed offshore. Particularly in subsea environments the high cost of diver support vessels calls for a repair clamp capable of rapid installation with minimal diver intervention. A semi-automated handling system is envisaged which, although expensive in terms of hardware, will reduce overall costs.

The object of the invention is to provide a pipe repair clamp which is applicable in those circumstances.

SUMMARY OF THE INVENTION

According to the invention, a clamp for repairing a pipe comprises two half-shells held together about said pipe (when the clamp is in use in the repair of the pipe) by two sets of interlocking formations, both half-shells being separated from said pipe by a gap, comprising in each set a series of abutments integral with a said half-shell arranged in a castellated formation and providing first surfaces facing away from the neighbouring half-shell and a series of hooks integral with said neighbouring half-shell and providing second surfaces opposed to and engaging said first surfaces of said abutments, the gap being closed by two longitudinal seals between the half-shells and by two 180° seals between the half-shells and the pipe at each end of the clamp, said gap being fillable with grout, said formations having been initially positioned by relative movement of said half-shells in a first direction transversely approaching said pipe, said hooks passing between said abutments in each set, then subsequently positioned by relative movement of said half-shells in a second direction parallel to the length of said pipe to bring said first surfaces and said second surfaces into opposition, and finally said first surfaces and said second surfaces being engaged by relative movement of said half-shells in a third direction transversely leaving said pipe.

In one form the half-shell has a series of abutments along one margin and a series of hooks along the diametrically opposite margin and the other half-shell having a complimentary series of hooks engaging the abutments of the first-mentioned half-shell and having a complementary series of abutments engaged by the hooks of said first-mentioned half-shell.

In another form one half-shell has two series of abutments along respective diametrically opposite margins, and the other half-shell has two series of complementary hooks engaging respective ones of said series of abutments.

BRIEF DESCRIPTION OF THE DRAWINGS

The invention will now be further described, by way of example, with reference to the accompanying drawings in which:

FIG. 4 is a vertical section transverse to the length of the pipe(not shown), showing further details of seals and the abutments and hooks in an intermediate stage of assembly of the half-shells of the clamp in FIG. 1.

DETAILED DESCRIPTION OF PREFERRED EMBODIMENTS

The description of the embodiment below is based on a clamp for use with a 24-inch (600 millimeter) gas transmission pipe installed subsea, but of course the invention is applicable to different sizes of pipe. For 24-inch pipe the length of the clamp is typically three pipe diameters.

The two scissors jacks described below are pivoted at the top from a beam (not shown) positioned above the pipe and parallel to the pipe. The beam forms part of a frame (not shown) placed on the seabed straddling the pipe. The frame would provide the facility of vertical, axial, lateral and rotational movement of the jacks. Guidance whilst manoeuvring the clamp would be by diver or video observation.

Figure 1:
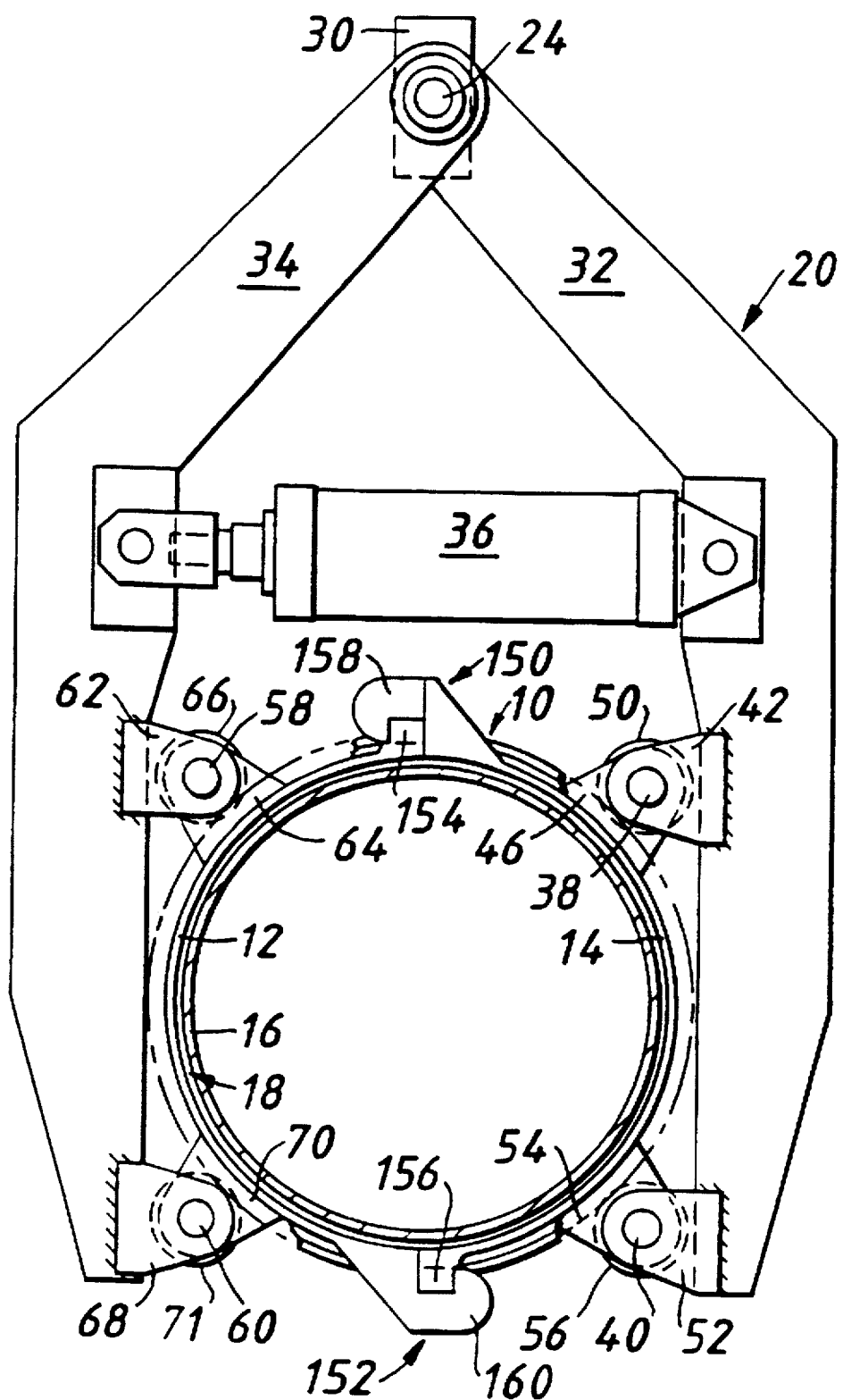
FIG. 1 is an end elevation, partly in vertical section, of an embodiment of a clamp formed according to the invention attached, temporarily, to a scissors jack during installation about a pipe.
Figure 2:
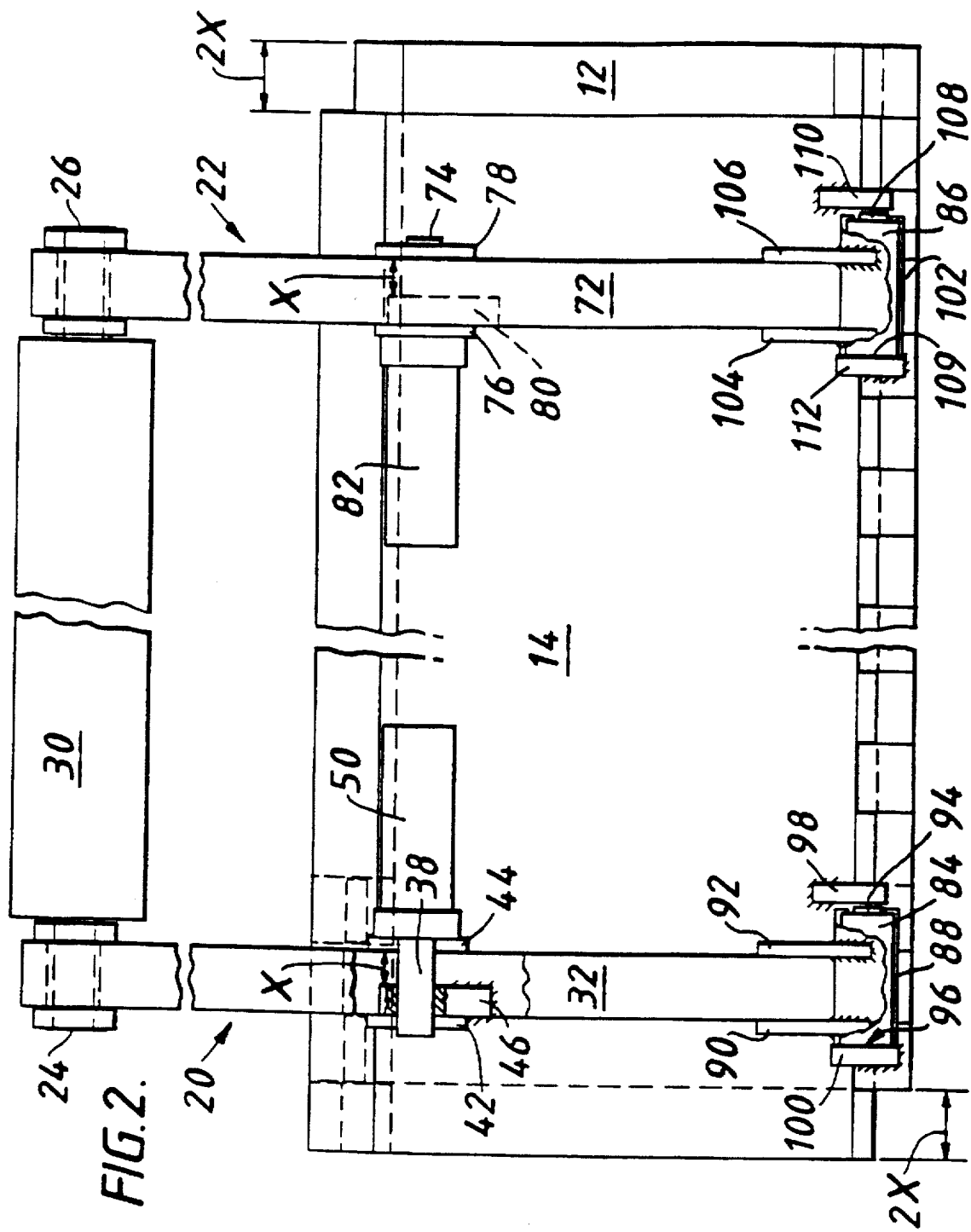
FIG. 2 is longitudinal side-elevation, partly in vertical section, of the assembly shown in FIG. 1.

FIGS. 1 and 2 shows a clamp 10 made up of two half-shells 12, 14 arranged around a pipe 16 with annular gap 18 between the clamp 10 and the pipe 16.

Two scissors jacks 20, 22 temporarily hold the half-shells 12, 14 during assembly. The jacks 20, 22 are suspended from respective pins 24, 26 on the beam 30 already mentioned. The jack 20 comprises two arms 32, 34 interconnected by a hydraulic cylinder 36. The arm 32 is connected by pins 38, 40 to the half-shell 14, the pin 38 passing through brackets 42, 44 of the arm 32 and a bracket 46 of the half-shell 14. The pin 38 is connected to the piston of a hydraulic cylinder 50 carried by the scissors arm 32.

The pin 40 similarly passes through brackets on the arm 32, only one of which is shown and marked 52, and a bracket 54 on the half-shell 14. The pin 40 is connected to the piston of a hydraulic cylinder 56 carried by the arm 32.

The other arm 34 of the scissors jack 20 is connected to the half-shell 12 by pins 58, 60. The pin 58 passes through brackets connected to the arm 34, only one of which is shown and is marked 62, and through bracket 64 connected to the half-shell 12. The pin 58 is connected to the piston of a hydraulic cylinder 66 carried by the arm 34. The pin 60 passes through brackets connected to the arm 34, only one of which is shown and is marked 68 and through a bracket 70 connected to the half-shell 12. The pin 60 is connected to the piston of a hydraulic cylinder 71 carried by the arm 34.

The arms of the other scissors jack 22, only one 72 of which is shown, is similarly connected by pins to the half-shells 12, 14. The arms of the jack 22 are connected by a cylinder similar to the cylinder 36.

One of the pins 74 is shown in FIG. 2, the pin 74 passing through brackets 76, 78 carried by the arm 72 and a bracket 80 (shown by dotted lines) carried by the half-shell 14. The pin 74 is connected to the piston of a hydraulic cylinder 82 carried by the arm 72. The details (not shown on the drawings) of the other pins, brackets and cylinders connecting the half-shells 12 and 14 to the scissors jack 22 are similar to those shown and already described.

The half-shells 12 and 14 are movable in opposite senses parallel to the direction of the length of the pipe (omitted from FIG. 2) by two hydraulic cylinders 84, 86 carried on the lower ends of the arms 32, 72, respectively.

This movement takes place relatively to the scissors jacks 20, 22, the half-shell 14 moving to the right, as seen in FIG. 2, with its brackets such as the brackets 46, 54 and 80 sliding along the pins, such as the pins 38, 40 and 74, so that the aforesaid brackets travel the distance marked X in FIG. 2. The half-shell 12 moves to the left as seen in FIG. 2, with its brackets such as the brackets 64, 70, for example, sliding along the pins, such as the pins 58 and 60, for example, so that the aforesaid brackets travel the same distance as X but in the opposite direction, the brackets starting off from positions to the right of that shown in FIG. 2.

The cylinder 84 is retained in a housing 88 but is free to move axially in the housing 88. The housing 88 is secured to the lower end of the arm 32 by two brackets 90, 92. The cylinder 84 has a piston rod 94. The end of the piston rod 94 and the opposite end 96 of the cylinder 84 respectively engage lugs 98, 100 secured, respectively, to the half-shell 14 and to a hook (described further below) secured to the half-shell 12.

The cylinder 86 is retained in a housing 102. The housing is secured by brackets 104, 106 to the lower end of the arm 72. The cylinder 86 has a piston rod 108. The end of the piston rod 108. The end of the piston rod 108 and the opposite end 109 of the cylinder 86 respectively engage lugs 110, 112 secured, respectively, to the half-shell 14 and to another hook (described further below) secured to the half-shell 12.

The half-shells 12 and 14 have two sets of interlocking formations 150, 152 at opposite sides. Each set of interlocking formations consists of a series of abutments 154, 156 in a castellated formation integral with the half-shells 12 and 14, respectively, and a series of hooks 158, 160 integral with the half-shells 12 and 14, respectively.

FIGS. 1 and 2 show the half-shells 12, 14 in positions in which they have been brought together by the scissors jacks 20, 22 by movement of the half-shells transversely approaching the pipe, hooks 158, 160 having passed between abutments 154, 156 in each set of interlocking formations, 150, 152. The cylinders 84, 86 have not yet been actuated to move the half-shells 12, 14 axially to bring the hooks 158, 160 into alignment with the abutments 154, 156.

Figure 3:
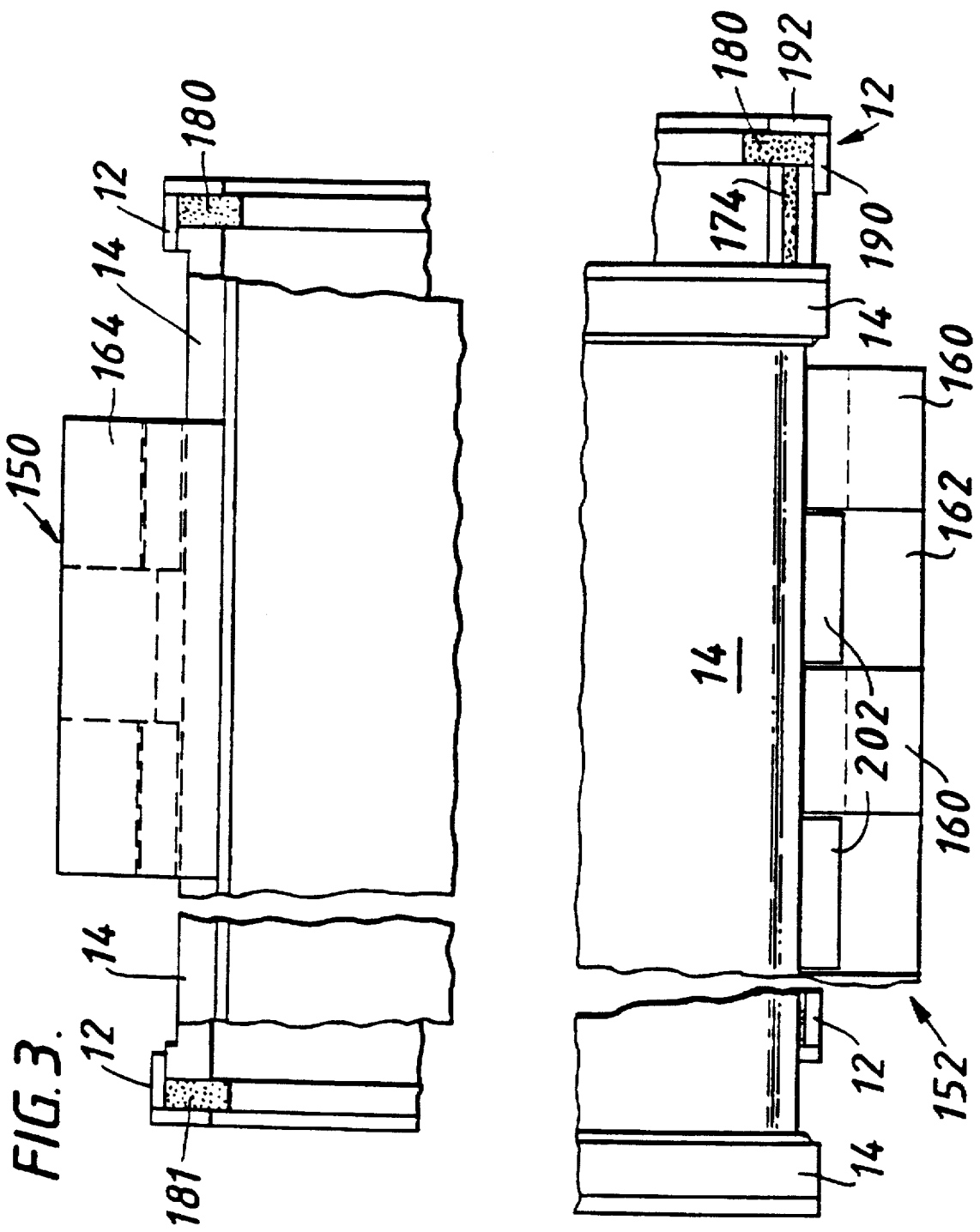
FIG. 3 is a fragmentary longitudinal side-elevation, partly in vertical section, showing details of internal seals within the clamp in FIG. 1 in the lower half and in the upper half respectively of FIG. 3, which halves show two stages of assembly of the clamp (the scissors jack being omitted for clarity)

FIGS. 3 and 4 show the interlocking formations 150, 152 in greater detail. The hooks are integral with a flange 162 welded to the half-shell 12 and the hooks 158 are integral with a flange 164 welded to the half-shell 14. The half-shell 12 has two longitudinal faces 165, 166 and the half-shell 14 has two longitudinal faces 168, 170. A groove 172 is formed in the face 166 and accommodates longitudinal seal 174. A groove 176 is formed in the face 168 and accommodates a longitudinal seal 178.

The half-shell 12 has two 180° seals one at each end which are shown in FIG. 3 and are marked 180 and 181. The seal 180 is held in place by a housing fabricated from a half-circumferential member 190 welded to the half-shell and a radially extending member 192 welded to the member 190. The half-shell 14 has two 180° seals, one at each end (not shown) and housed similarly to the seals 180, 181.

OPERATION

The half-shells 12, 14 mounted on the scissors jacks 20, 22 are lowered over the pipe 16 with the scissors open, the cylinders 36 being in the extended condition. The cylinders 36 are then retracted to bring the half-shells 12, 14 (by relative movement in a first direction transversely approaching the pipe 16) into the position shown in FIGS. 1, 2 and 4 and shown in the lower half of FIG. 3, the hooks 158, 160 passing between the abutments 154, 156, respectively.

The longitudinal faces 165 and 166 of the half-shell 12 are forced against the faces 168, 170, respectively, of the half-shell 14.

The cylinders 84, 86 are next actuated to move the half-shell 12 in a second direction axially to the left and seen in FIG. 2 and to move the half-shell 14 in a second direction axially to the right. This brings the hooks 158, 160 into alignment with the abutments 154, 156, respectively. At this stage the longitudinal faces 165 and 166 of the half-shell 12 are still in engagement with the longitudinal faces 168 and 170 of the half-shell 14.

The abutments 154 provide first surfaces 200 facing in the opposite direction to the adjacent face 165 on the half-shell 12. The abutments 156 provide first surfaces 202 facing in the opposite direction to the adjacent face 170 on the half-shell 14. The hooks 158 on the half-shell 14 provide second surfaces 204, opposed to the first surfaces 200. The hooks 160 on the half-shell 12 provide second surfaces 206, opposed to the first surfaces 202.

During the movement axially of the half-shells 12, 14 there are gaps 208 between the first and second surfaces 200, 204 and there are gaps 210 between the first and second surfaces 202, 206.

The final stage is to reverse the direction of actuation of the cylinders 36, that is to energise the cylinders in the opening sense. This relatively moves the half-shells in a third direction and separates the half-shells 12 and 14 and the gaps 208 and 210 are taken up, the first and second surfaces 200, 204 and the first and second surfaces 202, 206 being forced into engagement.

The cylinders 36 are kept energised in this way throughout the following stages of purging the gap 18 between the half-shells 12, 14 and the pipe 16 of seawater, and injection of repair grout into the gap 18, and during the stage of hardening of the grout. For example, the grout is a mixture of epoxy resin and sand.

Following those stages, the scissors jacks would be de-energised and the cylinders 50, 56, 66 and 71, and the cylinder 82 and other cylinders not shown, are energised to retract the pins (such as the pin 38) connected to their pistons so that the scissors jacks 20 and 22 are released from the half-shells 12, 14 and the scissors jacks 20, 22 can be removed.

It will be appreciated that when the half-clamps 12, 14 are moved axially into alignment, the 180° seals and the longitudinal seals, such as the seal 180, slide along the outer surface of the pipe 16. The seals are made of polyurethane, for example and it will also be appreciated that the two 180° seals at each end of the clamp occupy respective common planes when the half-clamps 12, 14 are moved axially into alignment. The opposed ends of the 180 degree seals seal against one another at each end of the clamp. Also, the longitudinal seals 174, 178 seal against the flanks of the 180° seals at each end of the clamp. One longitudinal seal 174 is shown sealing against the 180° seal 180 in FIG. 3.

Once the half-shells 12, 14 have been moved axially into alignment and before the grouting stage, it is necessary to check the pressure tightness of the complete seal assembly comprising the two longitudinal seals 174, 178 and the four 180° seals, such as the seal 180.

In order to keep annular gap 18 between the clamp 10 and the pipe 16 at a constant width all the way round the gap, it may be necessary to use hydraulic cylinders reacting off the pipe 16 at the ends of the clamp 10.

Although the clamp 10 has been described as used with a 24-inch pipe, the invention is applicable to the full range of pipe sizes, typical of which are pipes between 18-inch and 42-inch size.

In a modification (not shown), each set of abutments is integral with the same half-shell, the other half-shell being integral with each set of hooks.

We claim:

1. A clamp for repairing a pipe comprises two half-shells held together about said pipe, by two sets of interlocking formations, both half-shells being separated from said pipe by a gap, comprising in each set a series of abutments integral with a said half-shell arranged in a castellated formation and providing first surfaces facing away from the neighbouring half-shell and a series of hooks integral with said neighbouring half-shell and providing second surfaces opposed to and engaging said first surfaces of said abutments, the gap being closed by two longitudinal seals between the half-shells and by two 180° degree seals between the half-shells and the pipe at each end of the clamp, said gap being fillable with grout, said formations having been initially positioned by relative movement of said half-shells in a first direction transversely approaching said pipe, said hooks passing between said abutments in each set, then subsequently positioned by relative movement of said half-shells in a second direction parallel to the length of said pipe to bring said first surfaces and said second surfaces into opposition, and finally said first surfaces and said second surfaces being engaged by relative movement of said half-shells in a third direction transversely leaving said pipe.

2. A clamp according to claim 1, wherein one half-shell has a series of abutments along one margin and a series of hooks along the diametrically opposite margin and the other half-shell has a complementary series of hooks engaging the abutments of the first-mentioned half-shell and has a complementary series of abutments engaged by the hooks of said first-mentioned half-shell.

3. A clamp according to claim 1, wherein one half-shell has two series of abutments along respective diametrically opposite margins, and the other half-shell has two series of complementary hooks engaging respective ones of said series of abutments.

* * * * *

UNITED STATES PATENT AND TRADEMARK OFFICE
CERTIFICATE OF CORRECTION

PATENT NO. : 5,797,432

DATED : August 25, 1998

INVENTOR(S): Peter George BENNETT, et al.

It is certified that an error appears in the above-identified patent and that said Letters Patent is hereby corrected as shown below:

Column 2, Line 29, "pipe(not shown) should be --pipe (not shown)--

Column 3, Lines 44-45, Delete "The end of the piston rod 108."

Column 5, Line 32, Add: --when the clamp is in use in the repair of the pipe, --

Signed and Sealed this

Sixteenth Day of November, 1999

Attest:

Q. TODD DICKINSON

Attesting Officer

Acting Commissioner of Patents and Trademarks